(12) United States Patent
Chun et al.

(10) Patent No.: US 8,189,537 B2
(45) Date of Patent: May 29, 2012

(54) METHOD FOR RECONFIGURING RADIO LINK IN WIRELESS COMMUNICATION SYSTEM

(75) Inventors: Sung Duck Chun, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 544 days.

(21) Appl. No.: 12/159,580

(22) PCT Filed: Jun. 15, 2007

(86) PCT No.: PCT/KR2007/002920
§ 371 (c)(1),
(2), (4) Date: Jun. 27, 2008

(87) PCT Pub. No.: WO2007/148895
PCT Pub. Date: Dec. 27, 2007

(65) Prior Publication Data
US 2009/0005095 A1    Jan. 1, 2009

Related U.S. Application Data

(60) Provisional application No. 60/815,722, filed on Jun. 21, 2006, provisional application No. 60/827,866, filed on Oct. 2, 2006.

(51) Int. Cl.
H04W 4/00 (2009.01)
H04J 3/16 (2006.01)
(52) U.S. Cl. ........................................ 370/332; 370/437
(58) Field of Classification Search .................. 370/329, 370/331, 328, 332, 431, 437, 464, 465; 455/522
See application file for complete search history.

(56) References Cited

U.S. PATENT DOCUMENTS

| 5,659,756 A | 8/1997 | Hefferon et al. |
| 5,828,677 A | 10/1998 | Sayeed et al. |
| 6,088,342 A | 7/2000 | Cheng et al. |
| 6,138,158 A | 10/2000 | Boyle et al. |

(Continued)

FOREIGN PATENT DOCUMENTS

AU    2007-212916    8/2007

(Continued)

OTHER PUBLICATIONS

Huawei: "Further Considerations on Multiplexing Method of Shared Control Channel in Uplink Single-Carrier FDMA", 3GPP TSG-RAN WG1, R1-051430 [online], Nov. 7, 2005 [retrieved on Jul. 24, 2008]. Retrieved from the Internet: <http://www.3gpp.org/ftp/TSG_RAN/WG1_RL1/TSGR1_43/Docs/R1-051430.zip> pp. 1-6.

(Continued)

*Primary Examiner* — Chi Pham
*Assistant Examiner* — Feben M Haile
(74) *Attorney, Agent, or Firm* — Lee, Hong, Degerman, Kang & Waimey

(57) ABSTRACT

There is provided a method for enabling a user equipment to reconfigure a radio link in a wireless communication system. The method includes receiving a radio link reconfiguration message by a higher layer, requesting a lower layer to respond to the radio link reconfiguration message, configuring a response message for the radio link reconfiguration message, the response message decodable by the lower layer and transmitting the response message.

8 Claims, 4 Drawing Sheets

U.S. PATENT DOCUMENTS

| | | |
|---|---|---|
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer |
| 6,597,675 B1 | 7/2003 | Esmailzadeh et al. |
| 6,643,275 B1 | 11/2003 | Gustafsson et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 * | 2/2007 | Mir .................... 455/522 |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 * | 9/2009 | Park et al. ............ 370/329 |
| 7,664,059 B2 | 2/2010 | Jiang |
| 7,729,719 B2 | 6/2010 | Bergstrom et al. |
| 7,778,599 B2 | 8/2010 | Li et al. |
| 7,826,859 B2 | 11/2010 | Lee et al. |
| 7,848,308 B2 | 12/2010 | Lee et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0147371 A1 | 8/2003 | Choi et al. |
| 2003/0149371 A1 | 8/2003 | Shiga et al. |
| 2003/0210669 A1 | 11/2003 | Vayanos et al. |
| 2003/0223393 A1 | 12/2003 | Lee et al. |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0109422 A1 | 6/2004 | Naito |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak |
| 2004/0202140 A1 | 10/2004 | Kim et al. |
| 2004/0219920 A1 | 11/2004 | Love et al. |
| 2004/0229626 A1 | 11/2004 | Yi et al. |
| 2004/0248600 A1 | 12/2004 | Kim |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1 | 2/2005 | Torsner |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0118947 A1 | 6/2005 | Ames et al. |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 * | 9/2005 | Petrovic et al. ............ 370/331 |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0260997 A1 | 11/2005 | Korale et al. |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |

| | | | | | | |
|---|---|---|---|---|---|---|
| 2006/0056347 | A1 | 3/2006 | Kwak et al. | JP | 11-331949 | 11/1999 |
| 2006/0059186 | A1 | 3/2006 | Backlund | JP | 2000-032088 | 1/2000 |
| 2006/0062196 | A1 | 3/2006 | Cai et al. | JP | 2000-175271 | 6/2000 |
| 2006/0083183 | A1 | 4/2006 | Teague et al. | JP | 2000-184428 | 6/2000 |
| 2006/0088009 | A1 | 4/2006 | Gibbs et al. | JP | 2000175271 | 6/2000 |
| 2006/0120403 | A1 | 6/2006 | Murata et al. | JP | 2001-095031 | 4/2001 |
| 2006/0146745 | A1 | 7/2006 | Cai et al. | JP | 2001-522557 | 11/2001 |
| 2006/0153232 | A1 | 7/2006 | Shvodian | JP | 2002-501695 | 1/2002 |
| 2006/0154680 | A1 | 7/2006 | Kroth et al. | JP | 2002-135231 | 5/2002 |
| 2006/0168343 | A1 | 7/2006 | Ma et al. | JP | 2002-374321 | 12/2002 |
| 2006/0193282 | A1 | 8/2006 | Ikawa et al. | JP | 2003-008635 | 1/2003 |
| 2006/0256818 | A1 | 11/2006 | Shvodian et al. | JP | 2003-504942 | 2/2003 |
| 2006/0292982 | A1 | 12/2006 | Ye et al. | JP | 2003-504968 | 2/2003 |
| 2007/0060146 | A1 | 3/2007 | Won et al. | JP | 2003504968 | 2/2003 |
| 2007/0071025 | A1 | 3/2007 | Bergstrom et al. | JP | 2003-116172 | 4/2003 |
| 2007/0081483 | A1 | 4/2007 | Jang et al. | JP | 2003116172 | 4/2003 |
| 2007/0081513 | A1 | 4/2007 | Torsner | JP | 2003-174470 | 6/2003 |
| 2007/0099619 | A1 | 5/2007 | Parekh et al. | JP | 2003-333661 | 11/2003 |
| 2007/0104151 | A1 | 5/2007 | Papasakellariou et al. | JP | 2003333661 | 11/2003 |
| 2007/0106531 | A1 | 5/2007 | Deakter | JP | 2004-128967 | 4/2004 |
| 2007/0117579 | A1 | 5/2007 | Cai et al. | JP | 2004-312771 | 11/2004 |
| 2007/0121543 | A1 | 5/2007 | Kuchibhotla et al. | JP | 2004-349884 | 12/2004 |
| 2007/0135080 | A1 | 6/2007 | Islam et al. | JP | 2005-006660 | 1/2005 |
| 2007/0140115 | A1 | 6/2007 | Bienas et al. | JP | 2005-500761 | 1/2005 |
| 2007/0147326 | A1 | 6/2007 | Chen | JP | 2005500761 | 1/2005 |
| 2007/0206531 | A1 | 9/2007 | Pajukoski et al. | JP | 2005-510950 | 4/2005 |
| 2007/0218930 | A1 | 9/2007 | Kuo | JP | 2005-517369 | 6/2005 |
| 2007/0254662 | A1 | 11/2007 | Khan et al. | JP | 2005-522923 | 7/2005 |
| 2007/0274253 | A1 | 11/2007 | Zhang et al. | JP | 2005-217743 | 8/2005 |
| 2008/0031253 | A1 | 2/2008 | Kim et al. | JP | 2005-525720 | 8/2005 |
| 2008/0069031 | A1 | 3/2008 | Zhang et al. | JP | 2005-236988 | 9/2005 |
| 2008/0095105 | A1 | 4/2008 | Sundberg et al. | JP | 2005-244958 | 9/2005 |
| 2008/0130643 | A1 | 6/2008 | Jain et al. | JP | 2005237013 | 9/2005 |
| 2008/0137564 | A1 | 6/2008 | Herrmann | JP | 2005-278167 | 10/2005 |
| 2008/0212541 | A1 | 9/2008 | Vayanos et al. | JP | 2005278167 | 10/2005 |
| 2008/0232291 | A1 | 9/2008 | Hus et al. | JP | 2005-539462 | 12/2005 |
| 2008/0267136 | A1 | 10/2008 | Baker et al. | JP | 2006-014372 | 1/2006 |
| 2009/0175241 | A1 | 7/2009 | Ohta et al. | JP | 2006-025437 | 1/2006 |
| 2009/0319850 | A1 | 12/2009 | Baek et al. | JP | 2006020044 | 1/2006 |
| 2009/0323624 | A1 | 12/2009 | Kim | JP | 2006-352705 | 12/2006 |
| 2010/0014430 | A1 | 1/2010 | Oka | JP | 2006352705 | 12/2006 |
| 2010/0034095 | A1 | 2/2010 | Ho et al. | JP | 2007536790 | 12/2007 |
| 2010/0103899 | A1 | 4/2010 | Kwak et al. | JP | 2009-284532 | 12/2009 |
| 2010/0105334 | A1 | 4/2010 | Terry et al. | JP | 2009284532 | 12/2009 |
| 2010/0226263 | A1 | 9/2010 | Chun et al. | KR | 10-2001-0111637 | 12/2001 |
| 2011/0038376 | A1 | 2/2011 | Wiemann et al. | KR | 1020010111634 | 12/2001 |

FOREIGN PATENT DOCUMENTS

| | | |
|---|---|---|
| KR | 1020040048675 | 6/2004 |
| CN | 1315121 | 9/2001 |
| KR | 1020040064867 | 7/2004 |
| CN | 1411668 | 4/2003 |
| KR | 1020040089937 | 10/2004 |
| CN | 1430359 | 7/2003 |
| KR | 1020050029395 | 3/2005 |
| CN | 1565140 | 1/2005 |
| RU | 2168278 | 5/2001 |
| CN | 1658545 | 8/2005 |
| RU | 2191479 | 10/2002 |
| CN | 1663158 | 8/2005 |
| RU | 2232469 | 7/2004 |
| CN | 1692661 | 11/2005 |
| RU | 2232477 | 7/2004 |
| EP | 0617875 | 12/1997 |
| RU | 2237380 | 9/2004 |
| EP | 0978958 | 2/2000 |
| RU | 2263415 | 10/2005 |
| EP | 1009184 | 6/2000 |
| RU | 2270526 | 2/2006 |
| EP | 1041850 | 10/2000 |
| RU | 2009106289 | 8/2010 |
| EP | 1041850 A1 | 10/2000 |
| TW | 407407 | 10/2000 |
| EP | 1261222 | 11/2002 |
| TW | 548916 | 8/2003 |
| EP | 1361514 | 11/2003 |
| TW | 552815 | 9/2003 |
| EP | 1392074 | 2/2004 |
| TW | 586283 | 5/2004 |
| EP | 1441473 | 7/2004 |
| TW | 589818 | 6/2004 |
| EP | 1478203 | 11/2004 |
| TW | 590340 | 6/2004 |
| EP | 1496639 | 1/2005 |
| TW | 592412 | 6/2004 |
| EP | 1557968 | 7/2005 |
| TW | I228008 | 2/2005 |
| EP | 1599063 | 11/2005 |
| TW | I229268 | 3/2005 |
| EP | 1599063 A1 | 11/2005 |
| TW | I229268 | 3/2005 |
| EP | 1605724 | 12/2005 |
| TW | I229514 | 3/2005 |
| EP | 1684538 | 7/2006 |
| TW | 200522579 | 7/2005 |
| EP | 0978958 | 7/2010 |
| TW | I237478 | 8/2005 |
| GB | 2265522 | 9/1993 |
| TW | 200536318 | 11/2005 |
| JP | 06-013959 | 1/1994 |
| TW | I242951 | 11/2005 |
| JP | 06-121001 | 4/1994 |
| TW | I253824 | 4/2006 |
| JP | 09-055693 | 2/1997 |
| WO | 84/02021 A1 | 5/1984 |
| JP | 09-186704 | 7/1997 |
| WO | 99-44383 | 9/1999 |
| JP | 09-327072 | 12/1997 |
| WO | 99-63713 | 12/1999 |
| JP | 11-308671 | 11/1999 |
| WO | 99/63713 A1 | 12/1999 |
| | | |
| WO | 02-03720 | 1/2002 |

| | | |
|---|---|---|
| WO | 02/39697 | 5/2002 |
| WO | 02-39760 | 5/2002 |
| WO | 02/43403 | 5/2002 |
| WO | 0239760 A2 | 5/2002 |
| WO | 0247417 A1 | 6/2002 |
| WO | 02/075442 | 9/2002 |
| WO | 02-102110 | 12/2002 |
| WO | 03007636 A1 | 1/2003 |
| WO | 03-017691 | 2/2003 |
| WO | 03017691 A2 | 2/2003 |
| WO | 03-043259 | 5/2003 |
| WO | 03/043259 | 5/2003 |
| WO | 03043259 A1 | 5/2003 |
| WO | 03/047155 | 6/2003 |
| WO | 03056723 A1 | 7/2003 |
| WO | 03-096571 | 11/2003 |
| WO | 2004/030393 | 4/2004 |
| WO | 2004-034656 | 4/2004 |
| WO | 2004034656 A2 | 4/2004 |
| WO | 2004/042952 | 5/2004 |
| WO | 2004/042993 | 5/2004 |
| WO | 2004045234 | 5/2004 |
| WO | 2004-075442 | 9/2004 |
| WO | 2004/089030 | 10/2004 |
| WO | 2004-089030 | 10/2004 |
| WO | 2004/091130 | 10/2004 |
| WO | 2005006660 | 1/2005 |
| WO | 2005/018269 | 2/2005 |
| WO | 2005/034418 | 4/2005 |
| WO | 2005/036917 | 4/2005 |
| WO | 2005/055472 | 6/2005 |
| WO | 2005-055472 | 6/2005 |
| WO | 2005/071887 | 8/2005 |
| WO | 2005074312 A1 | 8/2005 |
| WO | 2005088886 A1 | 9/2005 |
| WO | 2005-099125 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005-125125 | 12/2005 |
| WO | 2005119941 | 12/2005 |
| WO | 2006/011953 | 2/2006 |
| WO | 2006/012946 | 2/2006 |
| WO | 2007/078156 | 7/2007 |
| WO | 2007/095966 | 8/2007 |
| WO | 2007148935 | 12/2007 |

OTHER PUBLICATIONS

NTT Docomo et al.: :Multiplexing Method of Shared Control Channel in Uplink Single-Carrier FDMA Radio Access, 3GPP TSG-RAN WG1, R1-051143 [online], Oct. 10, 2005 [retrieved on Jul. 24, 2008 ]. Retrieved from the Internet: <http://www.3gpp.org/ftp/tsg_ran/wg1_rl1/TSGR1_42bis/Docs/R1-051143.zip> pp. 1-8.

Philips: "Evolved Paging Indicators for LTE", 3GPP TSG-RAN WG2, R2-052985 [online], Nov. 7, 2005 [retrieved on Aug. 25, 2008]. Retrieved from the Internet: <http://www.3gpp.org/FTP/tsg_ran/WG2_RL2/TSGR2_49/Documents/R2-052985.zip> pp. 1, 2.

Sarkar, S. et al. Common-Channel Soft Handoff in cdma2000—The Paging Channel. IEEE Transactions on Microwave Theory and Techniques. Jun. 2000, vol. 48, No. 6, pp. 938 to 950, XP011037998, ISSN 0018-9480. abstract, section IV.

NTT Docomo, et al.: "Paging Channel Structure for E-UTRA Downlink", 3GPP TSG-RAN WG1, R1-060034 [online], Jan. 23, 2006 [retrieved on Aug. 25, 2008]. Retrieved from the Internet: <http://www.3gpp1.org/ftp/tsg_ran/WG1_RL1/TSGR1_AH/LTE_AH_January-06/Docs/R1-060034.zip> pp. 1-5.

Motorola: "Paging Channel Design for E-UTRA", 3GPP TSG-RAN WG1, R1-061712 [online], Jun. 27, 2006 [retrieved on Aug. 25, 2008]. Retrieved from the Internet: <http://www.3gpp1.org/ftp/tsg_ran/WG1_RL1/TSGR1_AH/LTE_AH_June-06/Docs/R1-061712.zip> pp. 1-3.

LG Electronics Inc.: "Framing in the MAC entity", 3GPP TSG-RAN WG2, R2-061012, Mar. 27-31, 2006.

LG Electronics Inc.: "HARQ and ARQ Operation", 3GPP TSG-RAN WG2, R2-060106, Jan. 9-13, 2006.

Ericsson, "E-UTRA Random Access," TSG-RAN WG1 #43, R1-051445, Nov. 7, 2005.

F.A. Zdarsky et al., "Handover in Mobile Communication Networks: Who is in Control Anyway?," Proceedings of the 30th EUROMICRO Conference, Aug. 2004, XP-10723593A.

LG Electronics Inc., "Framing in the MAC Entity," 3GPP TSG-RAN WG2 #52, R2-061012, Mar. 2006.

LG Electronics Inc., "HARQ and ARQ Operation," 3GPP TSG-RAN WG2 #50, R2-060106, Jan. 2006.

R.T. Derryberry et al., "On CDMA 2000 Evolution—Reverse High-Speed Packet Data Physical Layer Enhancements in CDMA 2000 1xEV-DV," IEEE Communications Magazine, Apr. 2005, vol. 43, No. 4, pp. 41-47, XP-001228792.

J. Chung et al., "Packet Synchronization and Identification for Incremental Redundancy Transmission in FH-CDMA Systems," Third IEEE International Symposium on Personal, Indoor, and Mobile Radio Communications, Oct. 1992, pp. 292-295, XP-010107082.

H. Xu et al., "Performance Analysis on the Radio Link Control Protocol of UMTS System," IEEE Publication, Jul. 2001, pp. 2026-2030.

Haardt, M., et al., "The TD-CDMA Based UTRA TDD Mode," IEEE Journal on Selected Areas in Communications, vol. 18, No. 8, pp. 1375-85, Aug. 2000.

Qualcomm, "Need for MAC-hs segmentation mechanism"m 3GPP TSG-RAN WG2 Meeting #28, R2-020769, Apr. 2002.

Motorola, et al, "MAC-e/es header and functional split", 3GPP TSG-RAN WG2 Meeting #45, R2-042360, Nov. 2004.

Ericsson, "User plane protocol enhancements", 3GPP TSG-RAN WG2 Meeting #48 bis, R2-052749, Oct. 2005.

LG Electronics Inc, "MAC Enhancement", 3GPP TSG-RAN WG2 #51, R2-060561, Feb. 2006.

Qualcomm, "Need for MAC-hs Segmentation Mechanism," R2-020769, 3GPP TSG RAN WG2 Meeting #28, Apr. 2002.

Motorola et al., "MAC-e/es header and functional split," R2-042360, 3GPP TSG RAN WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.4.0, Dec. 2008.

LG Electronics Inc., "UE State Transition in LTE_ACTIVE," R2-061002, 3GPP TSG-RAN WG2 #52, Mar. 2006.

Ericsson, "LTE States in E-UTRAN," R2-052425, TSG-RAN WG2 Meeting #48bis, Oct. 2005.

China Mobile, "RRC States Analysis in LTE," 3GPP TSG RAN WG2#48, R2-052140, Aug. 29, 2005.

Panasonic, "E-UTRA Transport and Logical Channels," 3GPP TSG RAN WG2#49, R2-052860, Nov. 7, 2005.

Siemens, "States in E-UTRAN," 3GPP TSG-RAN WG RAN2#48, R2-052501, Aug. 29, 2005.

Qualcomm Europe, "Signaling Optimization for E-UTRAN," 3GPP TSG-RAN WG2 Meeting #48-bis, R2-052407, Oct. 10, 2005.

LG Electronics Inc, "UE state transition in LTE_ACTIVE", 3GPP TSG-RAN WG2 #52, R2-061002, Mar. 27, 2006.

Ericsson, "Solution for sending NAS together with RRC connection request", 3GPP TSG-RAN WG #58, R2-071817, May 7, 2007.

3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.

LG Electronics Inc., "Discussion on RLC PDU Structure," R2-070721, 3GPP TSG-RAN WG2 #57, Feb. 2007.

IPWireless, "Layer 2 functions for LTE," R2-052377, 3GPP TSG RAN WG2 #48bis, Oct. 2005.

LG Electronics Inc., "MAC Architecture of LTE," R2-060105, 3GPP TSG-RAN WG2 #50, Jan. 2006.

LG Electronics Inc., "HARQ and ARQ Operation," R2-060563, 3GPP TSG-RAN WG2 #51, Feb. 2006.

Ericsson, "Solution for sending NAS together with RRC connection request," R2-071817, 3GPP TSG-RAN WG2#58, May 2007.

3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.

LG Electronics Inc., "Default SRB for initial access," R2-061958, 3GPP TSG-RAN WG2 LTE Ad-hoc, Jun. 2006.

* cited by examiner

[Fig. 1]
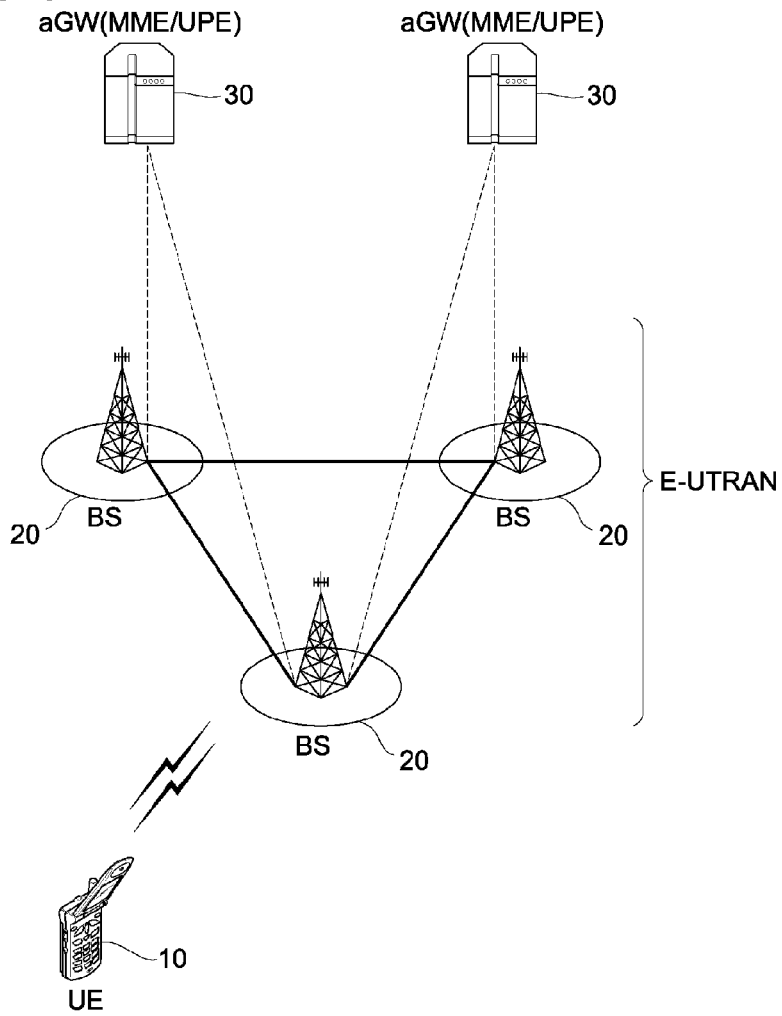
[Fig. 2]
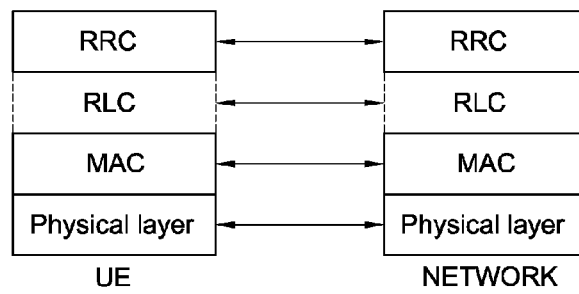
[Fig. 3]
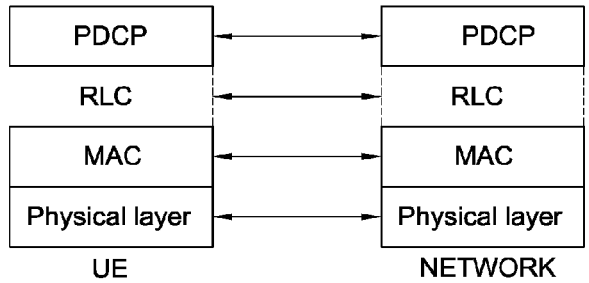

[Fig. 4]
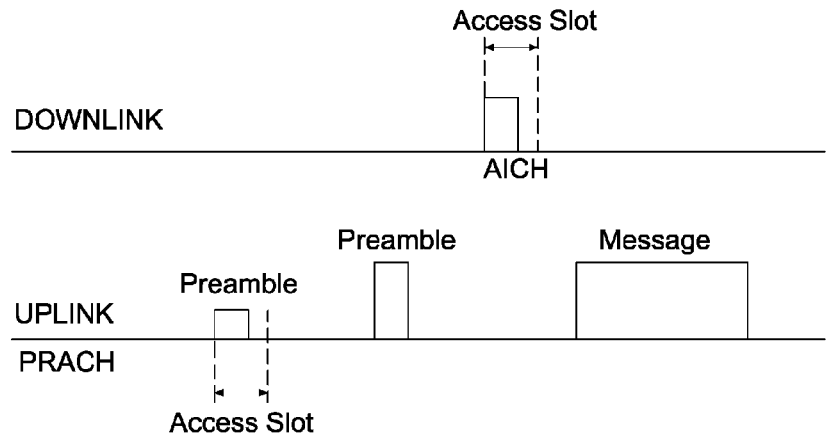
[Fig. 5]
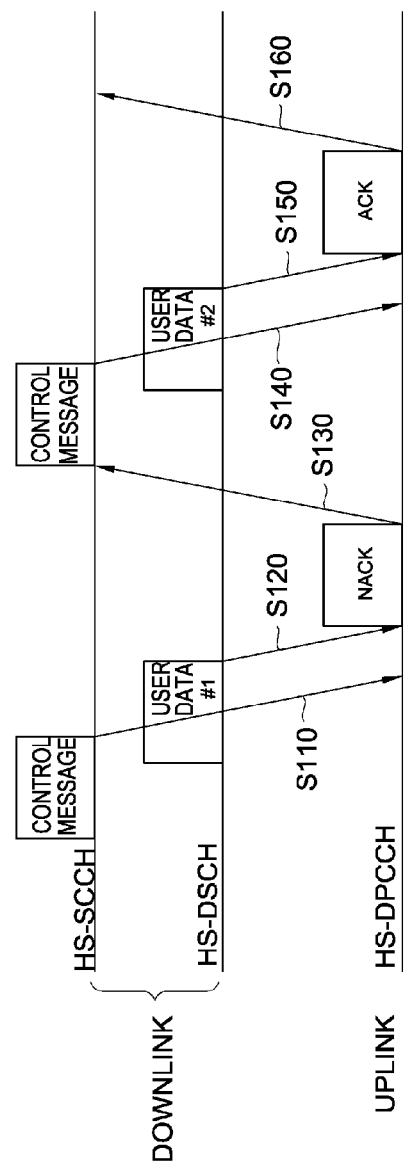

[Fig. 6]
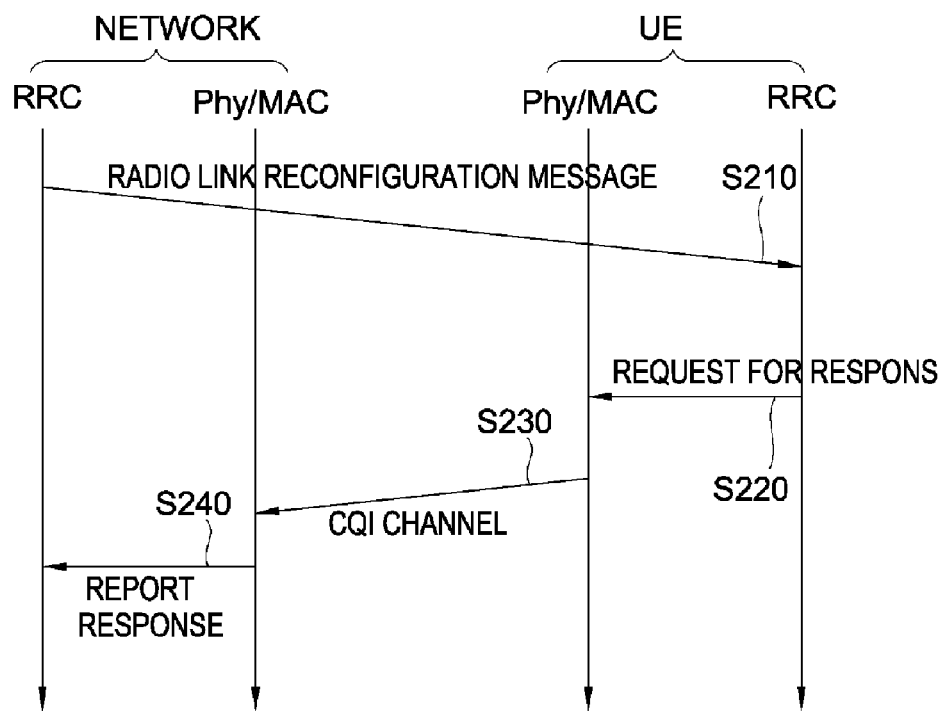
[Fig. 7]
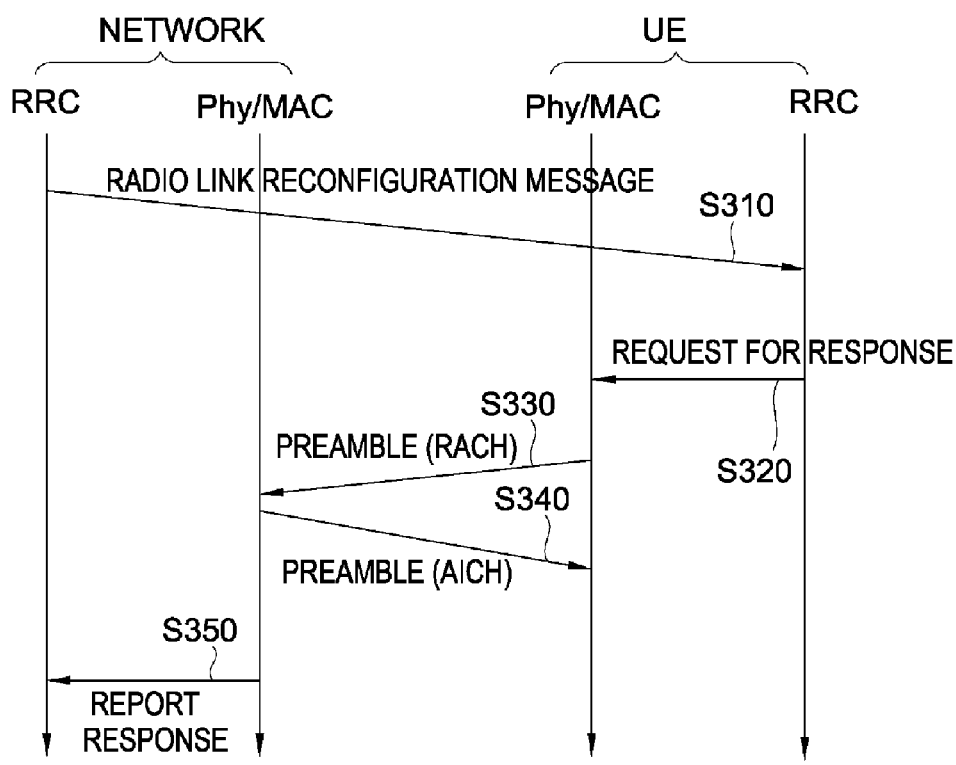

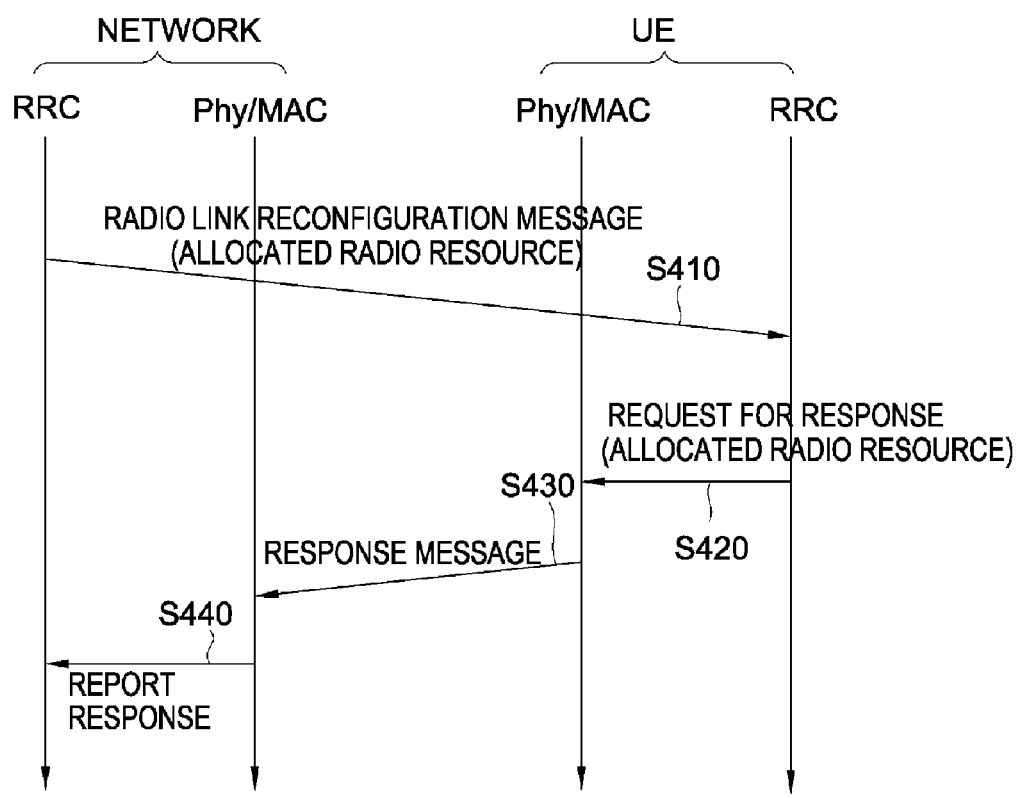
[Fig. 8]

US 8,189,537 B2

METHOD FOR RECONFIGURING RADIO LINK IN WIRELESS COMMUNICATION SYSTEM

This application is a national stage application of international application no. PCT/KR2007/002920, filed on Jun. 15, 2007, which claims the benefit of and right of priority to U.S. Provisional Application No. 60/815,722, filed on Jun. 21, 2006, U.S. Provisional Application No. 60/827,866, filed on Oct. 2, 2006 and Korean Application No. 10-2007-0025854, filed on Mar. 16, 2007.

TECHNICAL FIELD

The present invention relates to wireless communication, and more particularly, to a method for reconfiguring a radio link so as to enable a network and an user equipment to rapidly process the radio link control.

BACKGROUND ART

A third generation partnership project (3GPP) mobile system based on a wideband code division multiple access (WCDMA) radio access technology has been widely deployed all over the world. A high-speed downlink packet access (HSDPA), which is a first step in the evolution of the WCDMA, provides the 3GPP with a radio access technology having high competitiveness. However, since radio access technology has been continuously developed in view of requirements and expectations of users and providers, evolution of a new technology in the 3GPP is required to increase competitiveness. There are required reduced cost per bit, increased service availability, flexible use of a frequency band, a simple structure and an open interface, and adequate power consumption of a user equipment.

A wireless communication system is different from a wired communication system in that an user equipment moves. Accordingly, when establishing the wireless communication system, it is required to consider the mobility of the user equipment. The wireless communication system can cope with a situation in which the user equipment moves from one area to another area or cope with varying wireless environments. In addition, a radio link between the network and the user equipment has to be updated based on requests of the user in need. When a radio link configuration needs to be changed, a radio resource control (RRC) layer for managing a radio resource control or lower layer has to rapidly transmit information for configuring a new radio link to the user equipment and rapidly receive information from the user equipment.

When the configuring of a new radio link is delayed, a radio service quality felt by the user may deteriorate. For example, it is assumed that a higher quality cell is found than a cell currently accessed by the user equipment. The user equipment needs to exchange a current cell with a new cell. If a radio link is not reconfigured rapidly enough, the user equipment may lose the connection with the network. When the user equipment initiates to access the new cell with losing the connection, a reconfiguration for the radio link may be lengthen and loss of voice or packet data may occur.

An activation time can be utilized for reconfiguring a radio link. The activation time provides information on when to perform the reconfiguration of the radio link and when to use the new configuration of the radio link. If the network and the user equipment do not use the new configuration concurrently, the call may be lost. For example, assume that in the previous configuration a voice service is provided through a first channel and an internet service is provided through a second channel. In a new configuration, the voice service is provided through the second channel and the internet service is provided through the first channel. If the user equipment uses the new configuration from five past twelve and the system uses the new configuration from six past twelve, the voice service and the internet service do not normally operate for one minute from five past twelve to six past twelve. When the network and the terminal previously know that the new configuration is applied from six past twelve, the aforementioned problem does not occur. Accordingly, the activation time serves to enable the network and the user equipment to synchronize each other before the network and the user equipment use the new configuration.

The problem of the activation time is that the network does not know when the reconfiguration message which includes information of the activation time arrives at the user equipment. In the network, practically, there are considerable messages and data to be transmitted to user equipments. Since radio environments of the user equipments are different from one another, the network does not know the time needed for accurately transmitting the reconfiguration message to specific user equipment. Accordingly, the network determines the activation time based on the worst situation in which the reconfiguration message arrives at the terminal latest.

This causes a delay of the reconfiguration procedure. For example, the new reconfiguration is assumed to be a configuration in which the user equipment enters a sleep mode. At this time, it is assumed that the network determines the activation time to be a time after 3 seconds while transmitting a reconfiguration message for enabling the terminal to enter the sleep mode. The user equipment consumes more power for three seconds than in the case where the terminal enters the sleep mode without delay. This causes waste of power of the user equipment.

It is required a more rapid configuration and/or reconfiguration technique of a radio link.

DISCLOSURE OF INVENTION

Technical Problem

The present invention provides a technique of rapidly configuring and/or reconfiguring a radio link between a network and a user equipment.

Technical Solution

According to an aspect of the invention, there is provided a method for enabling a user equipment to reconfigure a radio link in a wireless communication system. The method includes receiving a radio link reconfiguration message by a higher layer, requesting a lower layer to respond to the radio link reconfiguration message, configuring a response message for the radio link reconfiguration message, the response message decodable by the lower layer and transmitting the response message.

According to another aspect of the invention, there is provided a method for enabling a network to configure or reconfigure a radio link in a wireless communication system. The method includes transmitting a radio link configuration message comprising information for an allocated radio resource and receiving a response for the radio link configuration message through the allocated radio resource. The allocated radio resource includes an uplink channel resource to transmit the response.

According to still another aspect of the invention, there is provided a method for configuring a radio link in a wireless communication system. The method includes receiving a radio link configuration message comprising information for an allocated radio resource, configuring a response message for the radio link reconfiguration and transmitting the response message using the allocated radio resource. The allocated radio resource includes an uplink channel resource to transmit the response message.

BRIEF DESCRIPTION OF THE DRAWINGS

FIG. 1 is a block diagram illustrating a wireless communication system.

FIG. 2 is a block diagram illustrating a control plane of a radio interface protocol.

FIG. 3 is a block diagram illustrating a user plane of a radio interface protocol.

FIG. 4 illustrates an example in which the PRACH is used.

FIG. 5 illustrates a HARQ scheme.

FIG. 6 is a flowchart illustrating a procedure of configuring a radio link according to an embodiment of the present invention.

FIG. 7 is a flowchart illustrating a procedure of configuring a radio link according to an embodiment of the present invention.

FIG. 8 is a flowchart illustrating a procedure of configuring a radio link according to an embodiment of the present invention.

MODE FOR THE INVENTION

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

Various multiple access schemes may be used in a wireless communication system. The multiple access scheme may be a single carrier modulation scheme (e.g. time division multiple access (TDMA), frequency division multiple access (FDMA), code division multiple access (CDMA), single carrier-frequency division multiple access (SC-FDMA)) or a multiple carrier modulation scheme (e.g. orthogonal frequency division multiple access (OFDMA)).

Orthogonal frequency division multiplexing (OFDM) technique relies on the orthogonality properties of the fast Fourier transform (FFT) and the inverse fast Fourier transform (IFFT) to eliminate interference between carriers. At a transmitter, data is encoded into constellation points and the complex values of the constellation points are inputs to the IFFT. For wireless transmission, the outputs of the IFFT are converted to an analog waveform, up-converted to a radio frequency, amplified and transmitted. At a receiver, the reverse process is performed. A received signal is amplified, down-converted to a band suitable for analog to digital conversion, digitized and processed by the FFT to recover the carriers. The multiple carriers are then demodulated and original data is recovered. Since the IFFT is used to combine the carriers at the transmitter, a corresponding FFT is used to separate the carriers at the receiver. OFDM may be combined with FDMA in an OFDMA system to allow multiplexing of multiple user equipments over the available bandwidth. Since OFDMA assigns user equipments to isolated frequency subcarriers, intra-cell interference may be avoided and high data rate may be achieved.

SC-FDMA utilizes single carrier modulation. Transmitters in a SC-FDMA system may use different orthogonal frequencies (subcarriers) to transmit data. However, they transmit the subcarriers sequentially, rather than in parallel. Relative to OFDMA, this arrangement reduces considerably the envelope fluctuations in the transmitted waveform. Therefore, SC-FDMA signals have inherently lower peak-to-average power ratio (PAPR) than OFDMA signals.

A communication system may be either a multiple-input multiple-output (MIMO) system or a single-input single-output (SISO) system. The MIMO system includes a plurality of transmit antennas and a plurality of receive antennas. The SISO system includes a single transmit antenna and a single receive antenna.

FIG. 1 is a block diagram illustrating a wireless communication system. This may be a network structure of an evolved-universal mobile telecommunications system (E-UMTS). The E-UMTS system may be referred to as a long term evolution (LTE) system. The wireless communication system is widely deployed so as to provide various communication services such as voice, packet data and the like.

Referring to FIG. 1, an evolved-UMTS terrestrial radio access network (E-UTRAN) may include base station (BS) 20. A user equipment (UE) 10 may be fixed or movable. The UE may be referred to as a mobile station (MS), user terminal (UT), subscriber station (SS) or wireless device. The BS 20 generally indicates a fixed station which communicates with the UE 10. The BS 20 may be referred to as an evolved-node B (eNB), base transceiver system (BTS) or access point (AP). At lest one cell may exist in the BS 20. An interface for transmitting a user traffic or control traffic may be used among the BSs 20.

Hereinafter, a downlink indicates communication from the BS 20 to the UE 10. An uplink indicates communication from the UE 10 to the BS 20. Same multiple access schemes may be used for the downlink and the uplink. For example, the uplink and the downlink may use OFDMA. Alternatively, different multiple access schemes may be used for the downlink and the uplink. The downlink may use OFDMA and the uplink may use SC-FDMA.

The BS 20 provides an end-point of a user plane and a control plane to the UE 10. BSs 20 may be connected to one another through an X2 interface. The BSs 20 are interconnected with each other by means of a X2 interface.

The BS 20 may be connected by means of a S1 interface to the EPC (Evolved Packet Core), more specifically to an access gateway (aGW) 30. The aGW 30 provides an end-point of a session and mobility management function for the UE 10. The SI interface supports a many-to-many relation between aGW 30 and BS 20. The aGW 30 may be classified into a part for processing a user traffic and a part for processing a control traffic. The aGW for processing the user traffic and the aGW for processing the control traffic can communicate with each other by the use of a new interface. The aGW 30 may be referred to as a mobility management entity/user plane entity (MME/UPE).

Layers of radio interface protocol between the UE 10 and the network may be classified into a first layer (L1 layer), a second layer (L2 layer) and a third layer (L3 layer) based on three lower-level layers of an open system interconnection (OSI) model that is widely known in communication networks. A physical layer belonging to the L1 layer provides an information transfer service through a physical channel. A radio resource control (RRC) layer belonging to the L3 layer serves to control radio resources between a UE and a network. The UE and the network can exchange an RRC message through the RRC layer. The RRC layer may be located in network modes such as a BS or an aGW. Alternatively, the RRC layer may be located at only the BS or the aGW.

The radio interface protocol horizontally includes a physical layer, a data link layer and a network layer. The radio interface protocol vertically includes a user plane for transmitting data information and a control plane for transmitting a control signal.

FIG. 2 is a block diagram illustrating the control plane of the radio interface protocol. FIG. 3 is a block diagram illustrating the user plane of the radio interface protocol. FIGS. 2 and 3 illustrate the structure of the radio interface protocol between a UE and the E-UTRAN based on a 3GPP radio access network standard.

As illustrated in FIGS. 2 and 3, the physical layer that is the first level provides an information transfer service to an upper-level layer through a physical channel. The physical layer is connected to a medium access control (MAC) layer, which is an upper-level layer of the physical layer, through a transport channel. Data is transferred between the MAC layer and the physical layer through the transport channel. Data is transferred between different physical layers, that is, a physical layer for a transmitter and a physical layer for a receiver, through the physical channel.

The MAC layer belonging to the L2 layer provides a service to a radio link control (RLC) layer that is an upper-level layer of the MAC layer through a logical channel.

The RLC layer belonging to the L2 layer supports reliable data transmission. It should be noted that the RLC layer is depicted in dotted lines, because if the functions of the RLC layer are implemented in and performed by the MAC layer, the RLC layer itself may not need to exist. The RLC layer serves to secure quality of service (QoS) of radio bearers (RBs) and transmit data based on the QoS. The RLC layer may include one or more independent RLC entities for each RB so as to secure QoS for each RB. In order to support various QoS, there are provided three RLC modes such as a transparent mode (TM), an unacknowledged mode (UM) and an acknowledged mode (AM). In addition, the RLC layer also serves to adjust a size of data by combination or segmentation since the size of the data from the upper layer of the RLC layer may vary and the lower layer of the RLC layer can generally transmit a pre-determined size of the data.

A packet data convergence protocol (PDCP) layer belonging to the L2 layer performs a header compression to reduce the size of an internet protocol (IP) packet header that may include unnecessary control information and has a relatively large size. The header compression makes IP packet, such as an IPv4 packet or an IPv6 packet to be efficiently transmitted through limited radio resource.

The radio resource control (RRC) layer belonging to the L3 layer is defined in only the control plane. The RRC layer serves to control the logical channel, the transport channel and the physical channel in association with configuration, re-configuration and release of a RB. The RB indicates a service provided by the L2 layer for transmitting data between a UE and a E-UTRAN.

A downlink transport channel for transmitting data from the network to the UE includes a broadcast channel (BCH) for transmitting system information and a downlink shared channel (DL-SCH) for transmitting a user traffic or a control message. The user traffic or the control message for a multi-cast service or a broadcast service may be transmitted through the DL-SCH or an additional downlink-multicast channel (DL-MCH). An uplink transport channel for transmitting data from the UE to the network includes a random access channel (RACH) for transmitting an initial control message and an uplink-shared channel (UL-SCH) for transmitting the user traffic or the control message.

Hereinafter, the RACH will be described.

In general, the RACH is used to synchronize a UE with a network and to acquire radio resources when the UE wants to transmit data but has no uplink radio resources for the data.

For one example, it is assumed that the UE try to access a new cell. The UE 10 receives the system information from the cell to acquire downlink synchronization. After completing downlink synchronization, the UE should establish a RRC connection to send some uplink data. An access request message can be used to request an uplink radio resource for the RRC connection. Since the uplink radio resources are not yet allocated for the access request message, the UE transmit the access request message through the RACH. The BS which receives the access request message allocates the radio resource. Then, the UE transmits the RRC connection request message to the network using the allocated radio resource.

For another example, it is assumed that a UE completes a RRC connection with a network. With the RRC connection, the network allocates an uplink radio resource and the UE transmits data to the network using the uplink radio resource. However, the network no longer allocates the uplink radio resource to the UE when no data is left in a buffer of the UE. This is because it is inefficient to allocate the uplink radio resource to the UE having no data to be transmitted. The state of the buffer of the UE can be reported to the network periodically or event-drivenly. When new data is received in the buffer of the UE requests the network to allocate the radio resource necessary for transmitting the new data through the RACH.

Hereinafter, a RACH in a wideband code division multiple access (WCDMA) system will be described.

The RACH is used to transmit short-length data in the uplink direction. An RRC message, such as an RRC connection request message, a cell update message and an URA update message, can be transmitted through the RACH. A URA defines a geographical area composed of one or more cells. A logical channel, such as a common control channel (CCCH), a dedicated control channel (DCCH) and a dedicated traffic channel (DTCH) may be mapped to the RACH. The RACH may be mapped to a physical channel, such as a physical random access channel (PRACH).

FIG. 4 illustrates an example in which the PRACH is used.

As illustrated in FIG. 4, the PRACH which is uplink physical channel may include a preamble part and a message part. The preamble part performs power ramping function to adjust transport power used to transmit a message and a function to avoid collision between several UEs. The message part transmits a MAC protocol data unit (PDU) which is sent from the MAC layer.

The physical layer of a UE selects an access slot and a signature and transmits the preamble part of the PRACH in the uplink direction, when the MAC layer instructs the physical layer to begin a random access procedure. The signature may be selected from among 16 signatures during a certain initial interval of the access slot. The preamble part which includes the signature may be transmitted during the access slot interval having a length of 1.33 millisecond (ms).

The BS may transmit a response of the preamble part through a downlink physical channel, such as an acquisition indicator channel (AICH). The response transmitted through the AICH include the signature which is transmitted through the PRACH so that the UE which receives the response can distinguish own response by the signature. The response may also include an acknowledgement (ACK) signal or a non-acknowledgement (NACK) signal. When receiving the ACK signal, the UE transmits the message part. When the UE receives the NACK signal, the MAC layer of the UE instructs the physical layer to transmit the preamble part through the PRACH after a predetermined time. When the UE does not receive any response, the UE transmits a new preamble part with higher power level.

FIG. 5 illustrates a hybrid automatic repeat request (HARQ) scheme. This illustrates a detailed embodiment of the HARQ applied to the downlink physical layer of the wireless communication system.

Referring to FIG. 5, a BS transmits a control message through a downlink control channel (S110). At a time associated to the control message, the BS transmits a first user data to the UE through the DL-SCH (S120). The downlink control channel may be a high speed-shared control channel (HS-SCCH) or high speed-downlink shared channel (HS-DSCH). The control message includes information on the UE which is to receive the first user data and a format of the first user data (a coding rate, a modulation size, a size of the user data and the like).

When the UE receives the first user data, the UE attempts to decode the first user data. When the UE fails in decoding the first user data, the UE transmits a NACK signal to the BS (S130). The NACK signal can be transmitted through a high speed-dedicated physical control channel (HS-DPCCH). The BS which receives the NACK signal retransmits the control message for a second user data at a suitable time (S140). The BS can also retransmit the second user data (S150). The second user data is a first retransmission data for the first user data. According to HARQ scheme, the second user data may be same to the first user data (e.g. chase combining) or different to the first user data (e.g. incremental redundancy).

When the UE receives the second user data, the UE combines the first user data and the second user data in various ways and attempts to decode the combined user data. When the UE succeeds in decoding the combined user data, the UE transmits an ACK signal to the BS (S160). The UE can transmit the ACK signal through the HS-DPCCH. The BS which receives the ACK signal acknowledges that the transmission of the user data succeeds. Here, a channel through which the ACK/NACK signal is transmitted is referred to as an ACK/NACK channel.

A BS transmits downlink data or allocates radio resources so as to allow the UE to transmit uplink data. A channel used to transmit information on allocation of downlink and uplink radio resources is referred to as an L1/L2 control channel. The L1/L2 control channel is a dedicated control channel. The BS can consider a channel environment before allocating the radio resources to the UE. In order to report the channel state between the BS and UE, the UE can utilize a channel quality indicator (CQI). The CQI is an indicator for representing the channel state. The CQI may be constructed in various types. A channel used to transmit the CQI is referred to as a CQI channel.

FIG. 6 is a flowchart illustrating a procedure of configuring a radio link according to an embodiment of the present invention.

Referring to FIG. 6, a RRC of a network constructs a radio link reconfiguration message to reconfigure a new radio link and transmits the radio link reconfiguration message to a UE (S210). A RRC of the UE receives the radio link reconfiguration message. The radio link reconfiguration message is an RRC message. Examples of reconfiguration of the radio link may be a CQI report continuation/stop, a CQI type change, an ACK/NACK signal structure change, a pilot structure change, a start or end of a measurement gap, discontinuous reception (DRX)/discontinuous transmission (DTX) cycle reconfiguration, a state transition from a synchronization state to a non-synchronization state and the like.

The RRC of the UE requests a lower layer (a MAC layer or physical layer) for responding to the radio link reconfiguration message (S220). Here, the lower layer indicates a layer lower than the higher layer. When the RRC layer is the higher layer, the MAC layer or physical layer lower than the RRC layer becomes the lower layer.

The lower layer of the UE sets a CQI to a predetermined value and transmits the CQI through a CQI channel (S230). The lower layer constructs a response message to the radio link reconfiguration message according to the request of the RRC. The response message constructed by the lower layer is a message which is recognizable or decodable in the lower layer. The lower layer transmits the response message through the CQI channel. For example, the CQI value is masked with a predetermined bit pattern or set to a predetermined value. When the CQI is represented with five bits and the CQI value ranges from 0 to 31, the CQI value 0-30 can be used to represent channel states and a specific CQI value 31 can be used to represent the response message.

The lower layer of the network reports receiving of the response message to the RRC (S240). The lower layer of the network can identify the response message by confirming the specific CQI value or by performing bit de-masking of the CQI channel. When the RRC confirms receiving of the response, the UE and the network can establish the new radio link.

When the RRC of the UE directly responds to the radio link reconfiguration message transmitted from the RRC of the network, reconfiguration can be delayed. When the RLC layer operates in the AM mode in response to the RRC message, it takes more time to confirm receiving of the RRC message. The radio link reconfiguration can be rapidly performed by enabling the response message to the radio link reconfiguration message to be directly transmitted from the lower layer of the UE to the lower layer of the network.

It is possible to rapidly identify the response message by receiving the response message through the CQI channel which is directly decodable in the lower layer. If the response message is constructed as the RRC message which is only decodable in the RRC, a plurality of layers such as a RRC of the BS, the lower layer of the BS, the lower layer of the UE, and the RRC of the UE have to be passed so as to identify the response message. Since the response message is constructed in the lower layer, the response message can directly be confirmed in the lower layer. Moreover, since the CQI channel is generally highly reliable, a transmission error can be minimized.

Here, although a reconfiguration of the radio link is described as an example, the proposed technique may be also applied to configuration of the radio link. The reconfiguration of the radio link is performed after configuration of the radio link is completed. It is possible to effectively perform configuration of the radio link by allowing the lower layer to construct a response message to a radio link configuration message before establishing the radio link.

When receiving the radio link configuration or the radio link reconfiguration message, the UE can transmit the response message through a predetermined channel in order to rapidly configure or reconfigure an RB between the network and the UE, When receiving the radio link configuration or the radio link reconfiguration message, the UE can transmit the response message by performing a predetermined procedure.

When receiving the radio link configuration or the radio link reconfiguration message, the UE can transmit the response message by using a predetermined radio resource.

When receiving the radio link configuration or the radio link reconfiguration message, the UE can configure a new radio link designated by the radio link configuration or the radio link reconfiguration message and use the new radio link so as to inform the network that the new radio link is established.

Although receiving a command for instructing the UE to configure or reconfigure a new radio link from the network through the RRC message, the UE does not transmit the response for indicating that the command is received through the RRC message. The UE can use the predetermined channel or perform the predetermined procedure to transmit the response.

Although receiving the command for instructing the UE to configure or reconfigure a new radio link from the network through the RLC message, the UE does not transmit the response for indicating that the command is received through the RLC message. The UE can use the predetermined channel or perform the predetermined procedure.

Although receiving the command for instructing the UE to configure or reconfigure a new radio link from the BS through the MAC message, the UE does not transmit the response for indicating that the command is received through the MAC message. The UE can use the predetermined channel or perform the predetermined procedure.

Although receiving the command for instructing the UE to configure or reconfigure a new radio link from the BS through a message such as RRC message, RLC message and MAC message, the UE does not transmit the response for indicating that the command is received through the message such as RRC message, RLC message and MAC message. The UE can use the new radio link based on the command for instructing the UE to configure or reconfigure the new radio link.

Although receiving the command for instructing the UE to configure or reconfigure a new radio link through the message such as RRC message, RLC message and MAC message, the UE does not response by using the message such as RRC message, RLC message and MAC message. The UE can transmit the response using the pre-determined channel or perform the predetermined procedure.

When the UE informs the network that the new radio link is established by using the predetermined channel or by performing the predetermined procedure, the network can forfeit a pending of the new radio link and does not wait for receiving the response from the UE anymore.

When transmitting the response through the predetermined channel, the UE can set one of fields to be transmitted through the predetermined channel to a predetermined value. The radio link configuration message or the radio link reconfiguration message can include the predetermined value.

The radio link configuration message or the radio link reconfiguration message can include information of the predetermined channel to be used to transmit the response of the radio link configuration message or the radio link reconfiguration message. An additional field can be added to the fields transmitted through the predetermined channel.

When transmitting the radio link configuration message or the radio link reconfiguration message, the network can provide the radio resources used to transmit the response by the UE.

The predetermined channel to transmit the response of the radio link configuration message or the radio link reconfiguration message may be a CQI channel. The response and a CQI can be multiplexed in the CQI channel.

The predetermined channel to transmit the response of the radio link configuration message or the radio link reconfiguration message may be a L1/L2 control channel.

The predetermined channel to transmit the response of the radio link configuration message or the radio link reconfiguration message may be a RACH.

The predetermined channel to transmit the response of the radio link configuration message or the radio link reconfiguration message may be an ACK/NACK channel. The response and an ACK/NACK signal can be multiplexed in the ACK/NACK channel.

The predetermined channel to transmit the response of the radio link configuration message or the radio link reconfiguration message may be a pilot channel. The response and a pilot can be multiplexed in the pilot channel.

The predetermined procedure to inform the network on the response of the radio link configuration message or the radio link reconfiguration message may be a random access procedure.

Transmission of the response of the radio link configuration message or the radio link reconfiguration message may indicate that the UE is ready to establishing the new radio link.

FIG. 7 is a flowchart illustrating a procedure of configuring a radio link according to an embodiment of the present invention.

Referring to FIG. 7, a network constructs a radio link reconfiguration message to configure a new radio link and transmits the radio link reconfiguration message to a UE (S310). The radio link reconfiguration message is a RRC message. The radio link reconfiguration message can include information of a predetermined preamble.

A RRC of the UE which receives the radio link reconfiguration message sends the request for the response to a lower layer (S320).

The lower layer of the UE begins the random access procedure by transmitting the predetermined preamble through a RACH (S330). The RACH including the pre-determined preamble becomes a response message to the radio link reconfiguration message.

When a lower layer of the network identifies the predetermined preamble transmitted through the RACH, the lower layer of the network returns the predetermined preamble to the UE through an AICH (S340). The predetermined preamble through the AICH becomes a response to the RACH.

The lower layer of the network reports receiving of the response message to the RRC of the network (S350). The lower layer of the network which receives the pre-determined preamble confirms that the response message to the radio link reconfiguration message is received and reports the confirmation result to a higher layer. The network and the UE complete to establish the new radio link.

The random access procedure is a contention based procedure for allocating uplink resources. The random access procedure is performed by using the predetermined preamble which is transmitted through the radio link reconfiguration message. When receiving the predetermined preamble through the RACH, the network confirms that the radio link reconfiguration for the UE is established. Since the random access procedure is performed in the lower layer of the RRC and is generally highly reliable, the network can more rapidly confirm the response to the radio link reconfiguration message.

FIG. 8 is a flowchart illustrating a procedure of configuring a radio link according to an embodiment of the present invention.

Referring to FIG. 8, the network transmits a radio link reconfiguration message to the UE (S410). The radio link reconfiguration message may include information of an allocated radio resource by which the response to the radio link reconfiguration message is transmitted. A radio resource is to be used by a physical channel in time domain (e.g. OFDM symbol) and/or frequency domain (e.g. subcarrier). The allocated radio resource may comprise a plurality of OFDM symbols and a plurality of subcarriers. The allocated radio resource may be a physical resource for an uplink physical channel. The uplink physical channel can be modulated in a SC-FDMA scheme. The uplink physical channel may comprise an uplink control channel or uplink data channel. The uplink physical channel may comprise at least one of a CQI channel, a ACK/NACK channel, a RACH, a pilot channel and L1/L2 control channel. When the uplink control channel is used as the uplink physical channel, a more rapid response is expected than in a case where the uplink data channel is used.

The RRC of the UE requests the lower layer for responding to the radio link reconfiguration message (S420). The RRC of the UE sends information of the allocated radio resource to the lower layer.

The lower layer of the UE transmits the response to the radio link reconfiguration message by using the allocated radio resource (S430). The lower layer of the UE may transmit the response message to the radio resource reconfiguration message by using the uplink physical channel designated by the allocated radio resource.

The lower layer of the network reports to the RRC of the network that the response message of the radio link reconfiguration message is received (S440). For example, when a predetermined frequency band is allocated so as to respond to the radio link reconfiguration message, the lower layer of the network can confirm whether to respond to the radio link reconfiguration message by determining whether there is a signal in the predetermined frequency band.

The radio link reconfiguration message includes the information of the allocated radio resource so that the network can rapidly receive the response of the radio link reconfiguration message and so that the UE can rapidly transmit the response. Although the radio link reconfiguration message is a RRC message, the radio link reconfiguration message may include information on radio resources used in the lower layer.

The network allocates a radio resource and sends the information of a allocated radio resource to the UE through the radio link reconfiguration message. The UE transmits the response to the radio link reconfiguration message by using the allocated radio resource.

In stead of transmitting the response in the RRC, the UE may transmit the response in a MAC layer. The UE can transmit the response in any layer lower than the RRC. A radio resource used to transmit the response may be a CQI channel, an ACK/NACK channel, an RACH, a pilot channel and the like. Alternatively, the network may identify the response by detecting energy of the allocated radio resource.

The UE may configure a new radio link based on information included in the radio link reconfiguration message and may immediately use the new radio link. The network can determine that the UE normally receives the radio link reconfiguration message by sensing the use of the new radio link and configure the new radio link too. For one example, it is assumed that a new radio link is obtained by changing a reporting period of the CQI. The UE transmits the CQI by using a new reporting period immediately when receiving the radio link reconfiguration message. The network determines that the UE normally receives the radio link reconfiguration message by sensing the transmission of the CQI with the new reporting period from the UE. For another example, it is assumed that a new radio link is obtained by suspending the transmission of the CQI. The network determines that the UE normally receives the radio link reconfiguration message by sensing that the UE does not transmit the CQI channel any more. The UE responds to the network that the UE normally establishing the new radio link not by transmitting the CQI channel any more.

When transmitting an instruction message for instructing the UE to configure or reconfigure a radio link, the network may transmit information of an allocated radio resource to be used when the UE transmits a response message of the instruction message. The instruction message may include the information of the allocated radio resource. The UE can rapidly transmit the response message through the allocated radio resource.

Although receiving a radio link configuration/reconfiguration message in a higher layer, the UE constructs a response message in a lower layer or performs a response procedure in the lower layer. It is possible to rapidly configure and/or reconfigure the radio link between the UE and the network.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for enabling a user equipment (UE) comprising a Radio Resource Control (RRC) layer and a Medium Access Control (MAC) layer to reconfigure a radio link associated with a base station (BS) comprising an RRC layer and a MAC layer, the method comprising:
   receiving, by the RRC layer of the UE, a radio link reconfiguration message from the RRC layer of the BS;
   requesting, by the RRC layer of the UE, that the MAC layer of the UE configure a response message in response to the radio link reconfiguration message;
   configuring, by the MAC layer of the UE, the response message in response to the request, wherein the response message includes Channel Quality Indicator (CQI) information configured at the MAC layer of the UE, and wherein the response message is decodable by the MAC layer of the BS; and
   transmitting, by the MAC layer of the UE, the response message to the MAC layer of the BS,
   wherein the response message is not sent via the RRC layer of the UE.

2. The method of claim 1, wherein the radio link reconfiguration message comprises information for an allocated radio resource and the response message is transmitted through the allocated radio resource.

3. The method of claim 1, wherein the radio link reconfiguration message comprises information of a predetermined preamble for a Random Access Channel (RACH) and the response message is transmitted through the RACH.

4. The method of claim 1, wherein the BS determines that information included in the radio link reconfiguration message is successfully received when the response message is received by the MAC layer of the BS.

5. A user equipment (UE) comprising a Radio Resource Control (RRC) layer and a Medium Access Control (MAC) layer for reconfiguring a radio link associated with a base station (BS), the UE comprising:
   a processor operatively coupled to a radio frequency (RF) unit and configured for:
      receiving, by the RRC layer of the UE, a radio link reconfiguration message from an RRC layer of the BS,
      requesting, by the RRC layer of the UE, that the MAC layer configure a response message in response to the radio link reconfiguration message,
      configuring, by the MAC layer, the response message in response to the request, wherein the response message includes Channel Quality Indicator (CQI) information configured at the MAC layer, and
      transmitting, by the MAC layer, the response message to a MAC layer of the BS,
   wherein the response message is decodable by the MAC layer of the BS, and
   wherein the response message is not sent via the RRC layer of the UE.

6. The user equipment of claim 5, wherein the radio link reconfiguration message comprises information for an allocated radio resource and the response message is transmitted through the allocated radio resource.

7. The user equipment of claim 5, wherein the radio link reconfiguration message comprises information of a predetermined preamble for a Random Access Channel (RACH) and the response message is transmitted through the RACH.

8. The user equipment of claim 5, wherein the BS determines that information included in the radio link reconfiguration message is successfully received when the response message is received by the MAC layer of the BS.

* * * * *